UNITED STATES PATENT OFFICE.

JOSEPH F. PFLIEGER, OF CORNING, OHIO.

COMPOSITION FOR TEMPERING TOOL-POINTS.

SPECIFICATION forming part of Letters Patent No. 683,490, dated October 1, 1901.

Application filed September 20, 1900. Serial No. 30,625. (No specimens.)

*To all whom it may concern:*

Be it known that I, JOSEPH F. PFLIEGER, a citizen of the United States, residing at Corning, in the county of Perry and State of Ohio, have invented a new and useful Composition for Hardening Tool-Points, of which the following is a specification.

In carrying out my invention I first provide a composition of matter which consists of the following ingredients combined substantially in the proportions stated, viz: carbonate of ammonia, six ounces; carbonate of potassium, six ounces; nitrate of potash, six ounces; soap, four ounces; soft water, fifteen gallons. These ingredients are thoroughly mingled by agitation. In utilizing the above composition for hardening the points of tools the tools to be hardened are as fast as the same are completed and while still at a red heat successively so arranged or supported above a vessel containing the liquid solution as to cause the points only of said tools to extend into the solution. The tools are thus left until the points are sufficiently cooled and hardened.

It has been demonstrated that the particular composition or solution herein set forth is exceedingly effective in imparting the desired temper to the tool-points.

What I claim, and desire to secure by Letters Patent of the United States, is—

The herein-described composition for tempering tool-points consisting of carbonate of ammonia, carbonate of potassium, nitrate of potash, soap and water substantially as described and for the purpose specified.

JOSEPH F. PFLIEGER.

In presence of—
 JAMES A. SWEENEY,
 PATRICK C. FRIEL.